US010994708B2

(12) United States Patent
Klein et al.

(10) Patent No.: US 10,994,708 B2
(45) Date of Patent: *May 4, 2021

(54) CONSTRUCTION MACHINE, IN PARTICULAR RUBBER-TIRED ROLLER OR ROAD FINISHER

(71) Applicant: BOMAG GmbH, Boppard (DE)

(72) Inventors: Thomas Klein, Wehr (DE); Thomas Haubrich, Godenroth (DE)

(73) Assignee: BOMAG GmbH, Boppard (DE)

( * ) Notice: Subject to any disclaimer, the term of this patent is extended or adjusted under 35 U.S.C. 154(b) by 62 days.

This patent is subject to a terminal disclaimer.

(21) Appl. No.: 16/513,960

(22) Filed: Jul. 17, 2019

(65) Prior Publication Data

US 2019/0337494 A1 Nov. 7, 2019

Related U.S. Application Data

(63) Continuation of application No. 15/278,384, filed on Sep. 28, 2016, now Pat. No. 10,391,983.

(30) Foreign Application Priority Data

Sep. 30, 2015 (DE) ...................... 10 2015 012 666.0

(51) Int. Cl.
*B60R 7/06* (2006.01)
*E01C 19/26* (2006.01)
(Continued)

(52) U.S. Cl.
CPC ................ *B60T 7/06* (2013.01); *B60N 2/062* (2013.01); *B60T 7/00* (2013.01); *B60T 7/02* (2013.01);
(Continued)

(58) Field of Classification Search
CPC ... B60T 7/06; B60T 7/04; E01C 19/26; B60N 2/062; B60N 2/06; B60Y 2200/413
(Continued)

(56) References Cited

U.S. PATENT DOCUMENTS 3,108,651 A 10/1963 Miller
3,273,950 A 9/1966 Oskar
(Continued)

FOREIGN PATENT DOCUMENTS

DE 19819158 A1 10/1999
DE 102006060014 A1 6/2007
(Continued)

OTHER PUBLICATIONS

Espacenet, English Machine Translation of DE19819158A1, published on Oct. 28, 1999, retreived from https://worldwide.espacenet.com (1 page).
(Continued)

*Primary Examiner* — Keith J Frisby
(74) *Attorney, Agent, or Firm* — Wood Herron & Evans LLP (57) ABSTRACT

The present invention relates to a construction machine, said construction machine comprising a brake assembly for braking the machine, as well as an operator platform. The operator platform comprises at least one operator seat with a total of at least two operating positions for a machine operator at opposite ends of the operator platform, and an actuation device for foot actuation of the brake assembly. According to essential aspects of the present invention, the actuation device for the brake assembly comprises a brake beam which extends transversely to the working direction of the construction machine and which can be operated by foot from said two operating positions, and the actuation device
(Continued)

further comprises an actuator for the brake beam, which is arranged below the brake beam.

20 Claims, 6 Drawing Sheets (51) Int. Cl.
  *B60N 2/06* (2006.01)
  *B60T 7/06* (2006.01)
  *B60T 7/00* (2006.01)
  *B60T 7/02* (2006.01)
  *B60T 7/04* (2006.01)

(52) U.S. Cl.
  CPC ............... *B60T 7/04* (2013.01); *B60T 7/045* (2013.01); *B60T 7/047* (2013.01); *E01C 19/26* (2013.01); *B60Y 2200/413* (2013.01); *E01C 2301/30* (2013.01)

(58) Field of Classification Search
  USPC ...... 180/326, 329, 89.13, 20, 330, 331, 325; 404/122, 117; 296/65.11, 65.12
  See application file for complete search history.

(56) References Cited

U.S. PATENT DOCUMENTS

| | | |
|---|---|---|
| 4,730,691 A | 3/1988 | Grigg |
| 5,406,778 A | 4/1995 | Lamb et al. |
| 5,921,340 A | 7/1999 | Abels |
| 2003/0127272 A1 | 7/2003 | Baker et al. |
| 2005/0252730 A1 | 11/2005 | Auer |
| 2008/0203753 A1 | 8/2008 | Klein et al. |
| 2010/0293934 A1 | 11/2010 | Mueller |
| 2011/0248541 A1 | 10/2011 | Haubrich et al. |
| 2012/0048639 A1 | 3/2012 | Haubrich et al. |
| 2012/0155961 A1 | 6/2012 | Norton |
| 2013/0103267 A1 | 4/2013 | DeWitt |
| 2013/0232877 A1 | 9/2013 | Tiekoetter |
| 2015/0075318 A1 | 3/2015 | Johnson et al. |

FOREIGN PATENT DOCUMENTS

| | | |
|---|---|---|
| DE | 102006050873 A1 | 4/2008 |
| DE | 102007018744 A1 | 8/2008 |
| DE | 102010035270 A1 | 3/2012 |
| DE | 112011104404 T5 | 9/2013 |
| EP | 0071872 A1 | 5/1996 |
| EP | 2374657 A2 | 10/2011 |
| GB | 1150331 A | 4/1969 |
| WO | 9015747 A1 | 12/1990 |

OTHER PUBLICATIONS

Espacenet, English Machine Translation of DE102006060014A1, published on Jun. 21, 2007, retreived from https://worldwide.espacenet.com (1 page).

Espacenet, English Machine Translation of DE102006050873A1, published on Apr. 30, 2008, retreived from https://worldwide.espacenet.com on Sep. 19, 2016 (1 page).

Espacenet, English Machine Translation of DE102007018744A1, published on Aug. 28, 2008, retreived from https://worldwide.espacenet.com on Sep. 19, 2016 (1 page).

Espacenet, English Machine Translation of DE102010035270A1, published on Mar. 1, 2012, retreived from https://worldwide.espacenet.com on Sep. 19, 2016 (2 pages).

Espacenet, English Machine Translation of DE112011104404T5, published on Sep. 19, 2013, retreived from https://worldwide.espacenet.com on Sep. 19, 2016 (1 page).

"Hydrostatic braking system increases safety underground"; Darren Parker; Nov. 21, 2008; <http://www.engineeringnews.co.za/print-version/hydrostatic-braking-system-increases-safety-underground-2008-11-21>.

CONSTRUCTION MACHINE, IN PARTICULAR RUBBER-TIRED ROLLER OR ROAD FINISHER

CROSS-REFERENCE TO RELATED APPLICATIONS

The present application is a Continuation application of U.S. Ser. No. 15/278,384, filed Sep. 28, 2016, which claims priority under 35 U.S.C. § 119 of German Patent Application No. 10 2015 012 666.0, filed Sep. 30, 2015, the disclosures of which are hereby incorporated herein by reference in their entireties.

FIELD OF THE INVENTION

The present invention relates to self-propelled construction machines for soil compaction such as tandem rollers usually moved at comparably low speeds during driving operation.

BACKGROUND OF THE INVENTION

By way of example, reference shall be made to the BOMAG BW 206 AD-5 AM model of the same Applicant, which has a maximum speed of approximately 12 km/h. This is also why generally the maximum brake effect required to bring such a construction machine to a halt is comparatively low despite the high weight of these construction machines. This is why construction machines of the above type are often times sufficiently braked by merely one hydrostatic brake assembly. The advantage of a hydrostatic brake assembly lies with the fact that it is particularly suitable for a recuperative braking process in which the kinetic energy lost through the braking process can be used again. Corresponding brake assemblies are known, for example, from prior art publications DE 10 2006 050 873 A1 and DE 10 2006 060 014 A1. Inter alia, one specific feature of hydrostatic brake assemblies is that they do not require separate actuation by the machine operator in addition to speed regulation.

However, some of the construction machines of the above type, in particular rubber-tired rollers, have a significantly higher maximum speed and may reach up to 20 km/h. A rubber-tired roller is described in DE 11 2011 104 404 T5, for example. The braking effect of one single hydrostatic brake assembly is not sufficient for such machines in order to bring the construction machine to a halt within a satisfactory time period. Accordingly, it is desirable to have an additional brake assembly. However, in contrast to hydrostatic brake systems, such brake assemblies need to be operated by the machine operator explicitly or separately from speed regulation for triggering a braking process. Thus, an actuation device is required via which the brake assembly can be operated by the machine operator. This poses a challenge with regard to the construction of such machines since the operating position of the operator within the operator cabin is oftentimes variable, "variable" in this context not relating to a minimal seat adjustment for consideration of different body sizes, but to various specific operating positions on the operator platform as, for example, alternatively on the right or on the left side. Operator platforms that include multiple operator seats in different positions at the same time are known from the prior art. As an alternative, seat assemblies are known in which an individual operator seat may take different positions on the platform by displacing or rotating said seat. For example, this may be effected by means of suitable rail systems, pivoting arms or pivoting and/or shifting consoles. In particular, in such cases it is known to provide the actuation elements, such as in particular the brake pedal, either in multiple form in the operator platform or to carry them along with the operator seat in a comparatively elaborate fashion, requiring considerable effort for the guidance of hydraulic tubes and/or electric signal lines. The known solutions are thus comparatively complicated and sometimes lead to undesirable redundancy and parallel architectures, respectively, resulting also in higher production and maintenance costs.

SUMMARY OF THE INVENTION

Thus, a principle of the present invention is to provide an actuation device for the brake assembly of a construction machine of the aforesaid type, which particularly comprises an operator platform with different operating positions and which has a simple structure and, at the same time, can be operated flexibly from different positions.

Specifically, the principle of the present invention is achieved by a construction machine which comprises a brake assembly for braking the construction machine and an operator platform. The operator platform comprises at least one operator seat with a total of at least two side operating positions for a machine operator. A "side operating position" specifically relates to a position of the operator seat on a side of the construction machine, i.e., the operator seat is positioned on the right or on the left-hand side on the operator platform when viewed in the working direction. The machine operator on the operator platform may thus view the side of the machine or view along the side of a machine from the respective side operating position. The present invention also comprises the option of fine-adjustment of the operator seat in the respective side operating position in order to enable adjustment of the seat position to various body sizes, for example. However, said regular seat adjustment when in a certain side operating position is explicitly not comprised in the adjustment of the entire operator seat to various side operating positions. The side operating positions are preferably located at opposite ends of the operator platform, for example, on the right-hand side of the operator platform and on the left-hand side of the operator platform with respect to the working direction or forward direction of the construction machine. Furthermore, the operator platform comprises an actuation device for foot actuation of the first brake assembly. Thus, the actuation device can be actuated by means of a foot movement by the operator seated on the operator seat.

One aspect of the present invention is to configure the actuation device for the brake assembly with a brake beam, said break beam extending transversely to the working direction of the construction machine on the operator platform in such a way that it can be operated by foot, in particular pressed, from the at least two side operating positions. The brake beam according to one embodiment of the present invention thus refers to a longitudinally extending operating element which longitudinally extends on the operator platform in particular transversely to the working direction in such a way that it can be reached by an operator seated in the operator seat from various positions of the operator seat and ideally across the entire adjustment range of the operator seat and can be actuated by foot for triggering a braking operation. Basically, the brake beam functions as a transferring element from the driver to an actuator of the actuation device, the actuator being arranged below the brake beam. As a result, on the one hand, carrying along the brake pedal upon seat adjustment between various side operating positions may be omitted, resulting in a considerably smaller construction effort. On the other hand, only one single actuator adapted for receiving and transmitting the braking signal is required since the machine operator can trigger the braking signal from various side operating positions centrally via one single brake beam. Accordingly, the specific construction of the brake beam is achieved in a simple and cost-effective manner.

Realization in practice has shown that it is particularly favorable for the brake beam to extend continuously across at least 65% and, more particularly, across at least 80% of the width of the base area of the operator platform, specifically arranged centrally in relation to the longitudinal center line in the working direction. Here, continuously means that the brake beam is configured such that it can be actuated across its entire length. Thus, the brake beam is continuous even if it comprises perforations or comparable structures, provided this does not obstruct continuous operability, in particular operation by foot. The relevant width of the base area depends on the arrangement of the brake beam. If the brake beam extends transversely to the working direction through the operator platform, the width of the operator platform or in particular the width of the floor of said platform is relevant here, more particularly the floor area in which the two side operating positions of the operator seat are located or in which the brake beam is arranged on the floor in a position that can be reached from the operator seat.

According to one embodiment of the present invention, a surface of the brake beam facing the operator seat corresponding to the step area of the brake beam is designed as a continuous actuation surface, in particular closed to the outside. This configuration is advantageous as it prevents or at least reduces the ingress of dirt into the region below the brake beam. It is particularly preferred here for the actuation surface to have an anti-slip coating so that the risk of the machine operator slipping-off with the foot and not being capable of properly controlling the braking operation is reduced. Such an anti-slip coating may be a roughened or an otherwise appropriately structured surface of a known type. In particular for production-related reasons, a rectangular design of the actuation surface and/or a cuboid design of the brake beam have proven to be advantageous.

The specific mounting of the brake beam may vary. For example, it is possible to mount the brake beam in its edge regions or directly and exclusively on an actuator. Mounting of the brake beam for an operator platform with a platform floor can be achieved in a particularly cost-effective manner which is also suitable for retrofitting if the brake beam is pivotally mounted via a joint, in particular a hinge, preferably directly, on the operator platform base. In order to allow for a particularly safe mounting, it is preferred in light of the longitudinal extension of the brake beam to not exclusively mount the brake beam via a single joint, in particular a hinge, but a plurality of joints/hinges, in particular three or more, which are preferably distributed at regular intervals in the direction of the longitudinal extension of the brake beam. This allows a particularly robust and safe mounting of the brake beam. It is particularly preferred for the brake beam to be mounted with an edge facing the operator seat via the joints/hinges on the platform base such that it can be easily pivoted downward away from the driver. This way, actuation by foot is possible in a particularly preferred manner.

According to another embodiment, the actuation device comprises a joint protection, particularly a hinge protection. Said protection is arranged above the joint/hinge and in particular configured as a chamfered protection strip along the entire edge of the brake beam facing the operator seat. The risk of the joint/hinge being damaged or impaired, for example, caused by the operating behavior of the machine operator or by sand or dirt carried onto the operator platform by the machine operator can be reduced by means of the joint/hinge protection. This results in a considerably reduced maintenance effort for the joint/hinge, for example.

According to another embodiment of the present invention, an edge of the brake beam facing away from the operator seat is chamfered relative to the step area of the brake beam, especially bent downwards. In particular, said edge is bent to the inside downwards twice at a right angle so that the double-bent part of the edge forms a support surface in the form of a U-shaped profile for the brake beam. This way, the edge facing away from the operator seat may form a stop, for example, by means of which the brake beam may rest on the operator platform base, without the entire lower side of the brake beam being parallel to the operator platform base. This way, the brake beam, in particular the actuation surface, can maintain a certain inclination relative to the operator platform floor also in a fully actuated position, in particular in a range of bigger than 0° to 20° so that an ergonomically more favorable foot position for the machine operator is enabled even when the brake beam is actuated or pushed down.

Transmission of the beam position to a brake actuator is basically effected indirectly or directly via the brake beam. Now, it is ideal in this case if a transmission mechanism for the actuator is completely covered upwards by means of the brake beam and the operator platform base. This way, a hollow space for the transmission mechanism and the actuator is obtained, which space is more or less shielded relative to the inside of the operator platform, in particular in connection with the aforementioned joints/hinges and the protection strip.

The brake beam is preferably spring-loaded, particularly in direction towards an end position in which no braking actuation is triggered. The spring load may be designed such that it acts directly on the brake beam. Thus, a return spring is articulated on the brake beam. However, return of the brake beam is preferably effected by means of a spring-loaded actuator. Here, the actuator is loaded with the return device in such a way that upon non-actuation of the brake beam said beam is automatically returned to a resting position, i.e., a position not triggering a braking effect. To this end, the return device is in particular arranged below the brake beam. With regard to reliability, it is particularly advantageous if the return device comprises multiple return springs which are in particular arranged to act parallel to one another. The present invention generally also covers such embodiments in which the return spring is replaced by another elastic component, such as a rubber buffer, for example. The embodiment mentioned is basically characterized by the fact that the automatic return of the brake beam into its resting position is ensured.

As the brake is an essential component with respect to the operational safety of a construction machine, it must be ensured that said brake can be actuated reliably during operation. As a safety measure, it is, in particular, provided to that end that the brake beam automatically sinks downward due to its own weight upon breaking of the return spring, thus permanently actuating the actuator. A braking action is triggered thereby and the construction machine is stopped. Another safety measure may consist in that the actuation device comprises a spring break sensor. Said sensor in particular serves for detecting a spring break of the return spring of the brake beam. This way, operational safety of the brake beam can be enhanced since damage of the return spring may be detected and an emergency stop of the machine may be initiated in the case that the detector detects a spring break. The spring break sensor may be arranged below the brake beam, for example. Regardless of the use of the return spring, devices ensuring functionality of the actuation device are generally preferably integrated in the actuation device.

For specific implementation of the present invention according to one embodiment, it has proven to be advantageous that the actuator is arranged centrally relative to the brake beam, in particular with respect to its longitudinal extension. Specifically, this central arrangement relates to the extension of the brake beam along a longitudinal central axis of the brake beam. In relation to the working direction of the construction machine, the longitudinal central axis of the brake beam thus preferably extends horizontally and essentially perpendicular to the working direction. Central arrangement of the actuator on the brake beam can ensure a most uniform operating behavior of the brake beam across the entire width of the brake beam.

Furthermore, the actuator may directly be connected to the brake beam. However, an arrangement of the actuator relative to the brake beam in such a way that said brake beam rests on the actuator and the two components move relative to one another upon actuation of the brake beam is preferred, with the two components remaining in direct contact. In order to reduce frictional forces here, a contact roller is arranged on the actuator, via which roller the brake beam rests on the actuator. The lower side of the brake beam directly forms a rolling surface for the contact roller. This way, inclination of the brake beam may be transferred into a movement of the actuator.

For the specific design of the actuator, the actuators known from prior art can basically be used. An actuator configured as brake pedal, comprising a lever element rotatable about an axis, is particularly suitable to that end. The actuator actuated by the brake beam is preferably connected to an electric, hydraulic or pneumatic brake valve either in mechanical or electrical manner. By means of such a brake valve, a braking operation can be initiated for the braking assembly in a manner known in the prior art.

Furthermore, it is preferred in one embodiment for the actuation device to include a side protection, which side protection is arranged on a side of the brake beam facing away from the operator seat and which is designed to seal a hollow space below the brake beam relative to said side. Here, the side of the brake beam facing away from the operator seat is in particular a face side of the brake beam and essentially extends in parallel to the working direction of the construction machine in its extension plane. This way, parts of the actuation device arranged in the hollow space below the brake beam, such as the actuator, for example, are protected against dirt and unintentional impairment by the machine operator also from this side. The side protection may be designed integrally with the actuation surface of the brake beam.

According to another embodiment of the present invention, the actuation device comprises a rotation angle sensor which is arranged below the brake beam or below the platform base. Said rotation angle sensor is designed to determine a rotation angle of the brake beam. Here, determination of the rotation angle can be effected directly, but, in particular, it is effected indirectly, by measuring an angle resulting from a mechanical transmission of the movement of the brake beam, from which the rotation angle of the brake beam can subsequently be determined using a known calculation rule. Also, the rotation angle sensor may be connected to an electronic control unit of the construction machine, such that data derived by the rotation angle sensor for rotating the brake beam may as well be used with control programs of the construction machine.

According to another embodiment of the present invention, the operator seat comprises at least one of the following features: The operator seat is configured as a rotatable operator seat, in particular about a vertical rotation axis, the operator seat is configured as a laterally displaceable operator seat, the operator seat is arranged on a laterally displaceable seat support or the operator seat is arranged relative to the brake beam in such a way that the brake beam is located within the comfort region of the seated machine operator, said region defined by the DIN EN ISO 6682:2009-06 standard for foot-actuatable controls in earth moving machines. In other words, it is an essential idea of the present invention that the operator seat is most flexible in positioning, such that only one operator seat which can particularly be adjusted between the side operating positions is required and a second operator seat can be dispensed with.

Furthermore, with respect to the design of the operator platform, the present invention can be combined with the systems disclosed in publications DE 10 2010 035 270 A1 and DE 10 2007 018 744 A1, which are hereby incorporated herein by reference.

The above-described brake assembly according to the present invention is preferably part of a larger brake system of the construction machine. The brake assembly according to the present invention is configured as operating brake here, in particular acting as a disc brake, drum brake or multi-disc brake. To that end, the brake system comprises a second brake assembly, which brake assembly is designed in particular as a hydrostatic brake assembly. Preferably, the braking effect of the brake assembly and the braking effect of the second brake assembly can be combined into a joint braking effect by means of the brake system. This can be effected in a way basically known by a person of ordinary skill in the art.

The brake assembly according to the present invention is particularly suitable for construction machines, in particular for road finishers or soil compactors, in particular rubber-tired rollers. Said construction machines require frequent braking operations on the one hand and regular operations from different sides of the operator platform on the other hand.

BRIEF DESCRIPTION OF THE DRAWINGS

The present invention is described in more detail below by means of the exemplary embodiments indicated in the figures. In the schematic figures.

Like components are indicated with like reference numerals throughout the drawings, however not every repeating component is necessarily indicated separately in each drawing.

DETAILED DESCRIPTION OF THE INVENTION

Figure 1A:
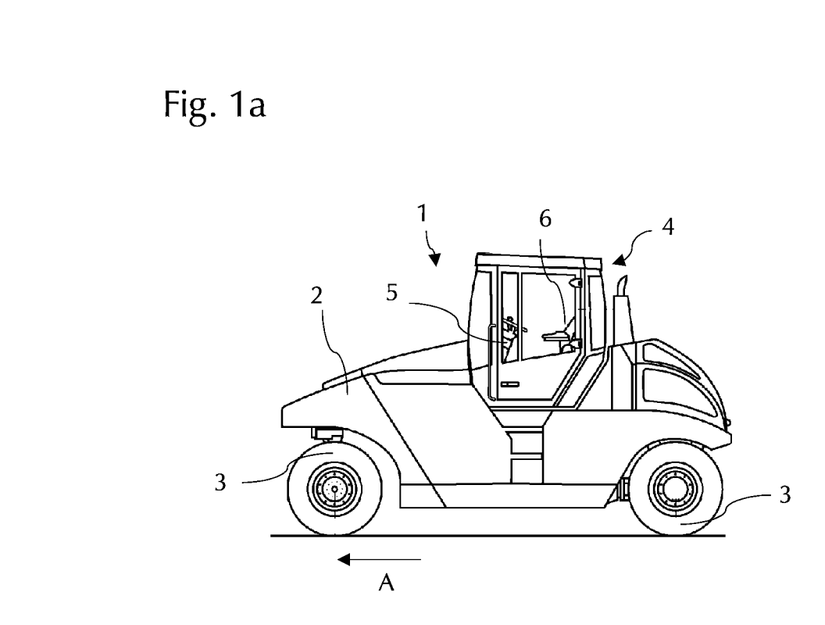
FIG. 1a shows a side view of a rubber-tired roller.

FIG. 1a is a side view of a construction machine 1, in particular a rubber-tired roller. Construction machine 1 comprises a machine frame 2 and two running gears 3, each having multiple rubber tires for compacting the underlying soil. At the same time, said running gears 3 serve for moving the construction machine 1. During working operation, the construction machine travels in the working direction A using the running gears 3, thereby compacting the underground by acting on the latter with its operating weight via the rubber tires. Furthermore, an operator platform 4 for the machine operator is provided for operating the construction machine 1, the platform comprising an operating console 5 and an operator seat 6.

Figure 1B:
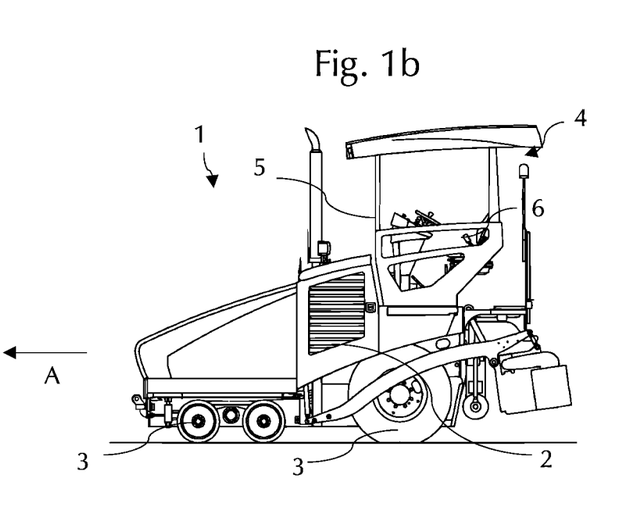
FIG. 1b shows a side view of a road finisher.

FIG. 1b illustrates the general configuration of another construction machine 1 which is particularly suitable for being used in the present invention. In particular, said machine is a road finisher likewise comprising an operator platform 4, on which an operating console 5 and an operator seat 6 are arranged for operating the machine. The road finisher comprises multiple tires 3 as a moving device, although it is also possible to use crawler tracks here.

Both construction machines 1 shown in FIGS. 1a and 1b have in common that the operator located on the operator platform 4 often needs to view either the left side or the right side of the machine depending on the current working situation, for example, when driving the machine along edges or other obstacles. To that end, the operator seat 6 is arranged such that it can be adjusted from a right side operating position, in which the driver is capable of viewing the right machine side, to a left side operating position, in which the driver is capable of viewing the left machine side. A device that enables such adjustability is disclosed, for example, in patent specifications DE 10 2010 035 270 A1 and DE 10 2007 018 744 A1 of the same Applicant, which are hereby incorporated herein by referenced.

The following figures explain further details on the configuration of the operator platform and functionality of the present invention.

Figure 2:
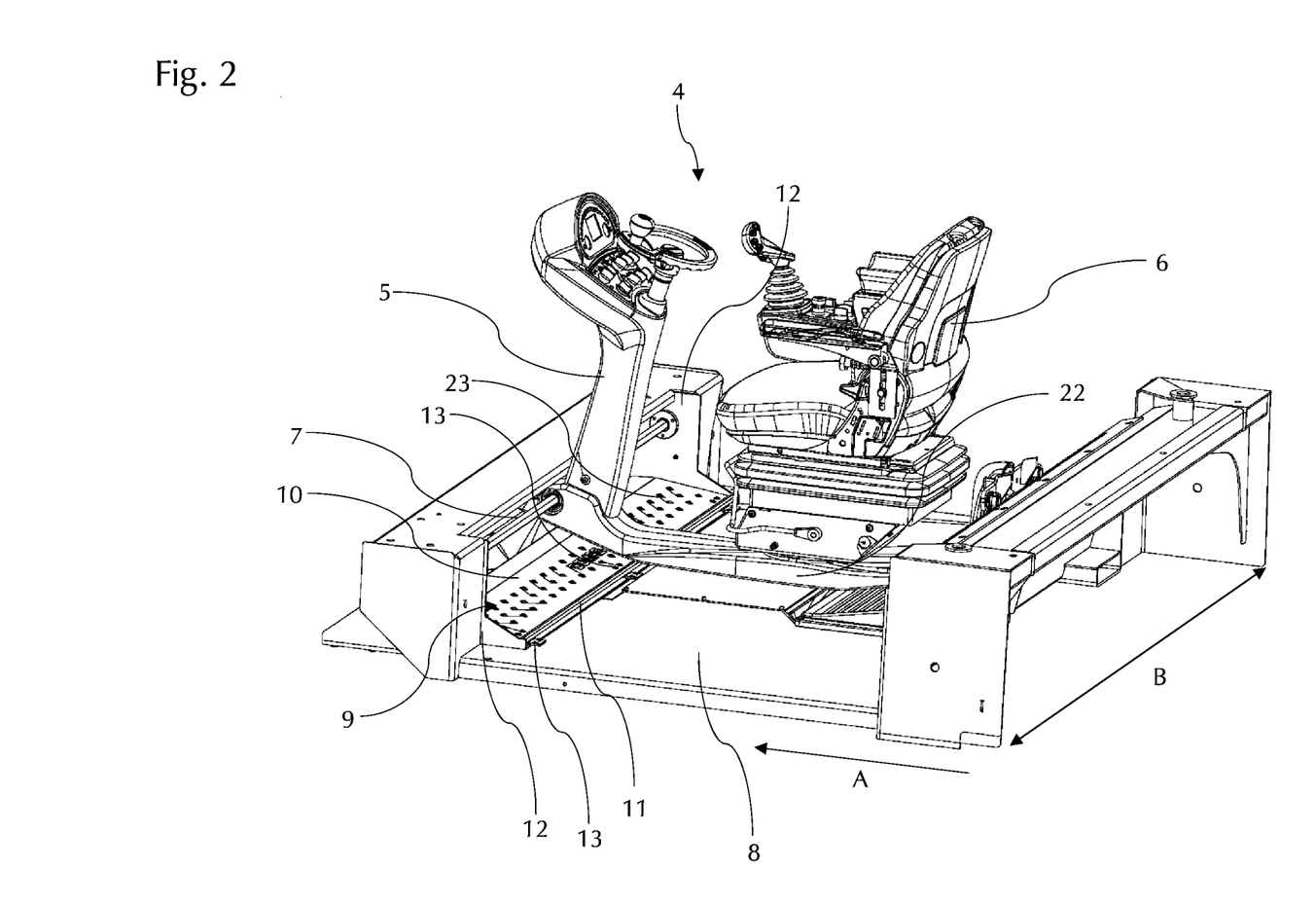
FIG. 2 shows a perspective view of the operator platform of a construction machine according to the present invention.

First, an overview of the specific configuration of the operator platform 4 in a perspective view can be taken from FIG. 2. The operator seat 6 is arranged on a seat support 22 which is designed to have a support for the operator console 5 arranged opposite the operator seat 6. The seat support 22 enables moving the operator seat 6 and the operator console 5 together along a guide rail 7 back and forth between the outer sides of the operator platform 4 in a parallel, sled-like manner transversely to the working direction or forward direction A of the construction machine 1. In addition to said adjustment of the seat position, the operator seat 6 can be fine-adjusted on the seat support 22, for example, in terms of height, front-back-position and side position. However, this adjustment allows adjusting the seat within the range of a few centimeters only, whereas adjustment via the guide rail enables adjustment across the entire width B of the operator platform or the platform base 8, respectively. The platform base 8 forms the bottom boundary of the platform 4.

The brake beam 10 is arranged on the operator platform 4 opposite the operator seat 6 and is comfortably reachable by foot for the machine operator, the brake beam 10 being part of an actuation device 9 for actuating a brake assembly of the construction machine 1. The brake beam 10 is supported on the platform base 8 by multiple joints, in particular rotary joints, in the present exemplary embodiment, for example, by means of parallel arranged hinges 13, on the side facing the operator seat 6 in such a way that it can be pivoted along said hinges 13 with a degree of freedom about an axis oriented horizontally and transversely to the working direction. In other words, the brake beam 10 can be folded up and down along the hinges 13. The brake beam 10 can be pivoted along the hinges 13 between an entirely operated position and a rest position, the rest position and the entirely operated position each being defined by a stop of the brake beam 10.

Furthermore, a surface of the brake beam 10 facing the operator seat 6 is configured as an actuation surface 23. Actuation of the brake beam 10 is effected in such a way that the machine operator acts on the brake beam 10 by foot, as a result of which the brake beam folds downward about pivot axes of the hinges 13 as a result. Said hinges 13 are also located in the region provided for foot actuation by the machine operator. For this reason, the brake beam 10 terminates toward the operator side by means of a joint or hinge protection, which is in the present case configured as a chamfered protection strip 11. Said protection strip 11 covers the hinges 13 and thus protects them against mechanical damages by the machine operator as well as against contamination. The actuation device 9 in each case terminates with a side protection 12 toward the sides of the operator platform 4, said side protection 12 delimiting a hollow space 20 below the brake beam 10 sideward. This way, the side protection 12 also serves for protecting the actuation device 9 overall against ingress of dirt or unintentional mechanical damage. This is relevant particularly because the actuator 15 for the brake beam 10 is also arranged in the hollow space 20 below the brake beam 10, and is thus also protected. However, said hollow space 20 and actuator 15 are not shown in FIG. 2 as they are covered by the brake beam 10 in this view. In the present exemplary embodiment, the side protection 12 is a protection plate 12 protruding from the platform base, although it is also possible and covered by the present invention to consider other alternatives such as protection mats, bellows, etc. The essential factor is that the hollow space located below the brake beam 10 is covered outward by the side protection 12 sideward.

Figures 3A, 3B, 3C:
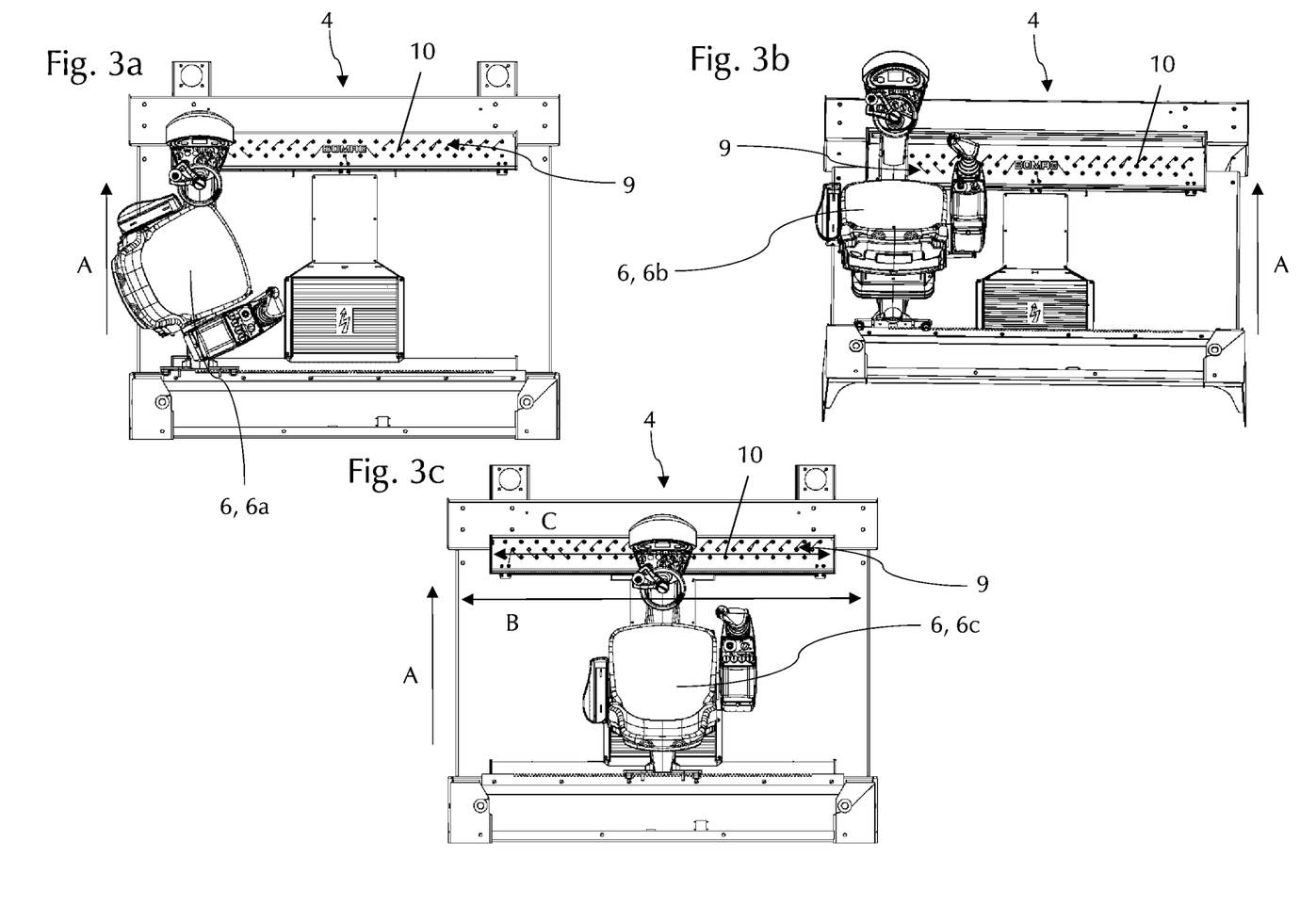
FIGS. 3a to 3c show in each case a plan view of the operator platform of a construction machine according to the present invention with an operator seat in different positions.

FIGS. 3a to 3c each show the operator platform 4 in a plan view with different positions of the operator seat 6, said seat taking different operating positions 6a, 6b, 6c. FIGS. 3a to 3c particularly show that the operator seat 6 both can be shifted to the sides of the platform 4, i.e., horizontally and transversely to the working direction A, and is also mounted so as to be rotatable about a vertical axis. Here, operating positions 6a, 6b and 6c merely show exemplary positions among a huge number of possible operating positions that can be taken by the operator seat 6, which in the present exemplary embodiment can be adjusted essentially continuously between the two outer operating positions thereof, with FIG. 3a showing the left side operating position with an operator seat 6 rotated, and FIGS. 3b and 3c showing the left side and the central operating position, respectively, with an operator seat 6 in each case oriented in the forward or working direction A of the construction machine. Just as well, displacement of the operator seat 6 to the right side of the platform 4 viewed in the working direction is possible (corresponding to the right side operating position), or a rotation of the operator seat 6 when in a position central on the platform 4.

Due to is central arrangement on the platform 4 and its ergonomic shape, the brake beam 10 can be operated and comfortably reached by foot by the machine operator from all operating positions. Thus, flexibility in positioning the operator seat 6 can be entirely exploited by the machine operator, and he is not limited to a low number of actually possible operating positions by specifically assigned foot actuation devices with limited accessibility, as they are known from the prior art. To that end, the brake beam is designed as a beam-shaped element oriented horizontally and, with its longitudinal extension transversely to the working direction, said element having essentially the surface of a rectangle, with the longitudinal sides being considerably longer than the face sides, i.e., in the present case preferably at least by the factor 5. Furthermore, the width C of the brake beam extends across about 80% of width B of the platform and thus continuously extends across the most part of the platform. This ensures that the operator is capable of reaching the brake beam from the operator seat from a variety of different adjustment positions of the operator seat.

Furthermore, the brake beam with its surface facing the operator is designed continuously and uniformly over its entire width (orientation transversely to the working direction) in order to enable the same operating conditions across the entire width of the brake beam. Here, the term "continuous" should be understood such that the surface is not necessarily designed in a closed fashion (although this is preferred), but forms a continuous operating surface for the foot of the operator.

Figure 4:
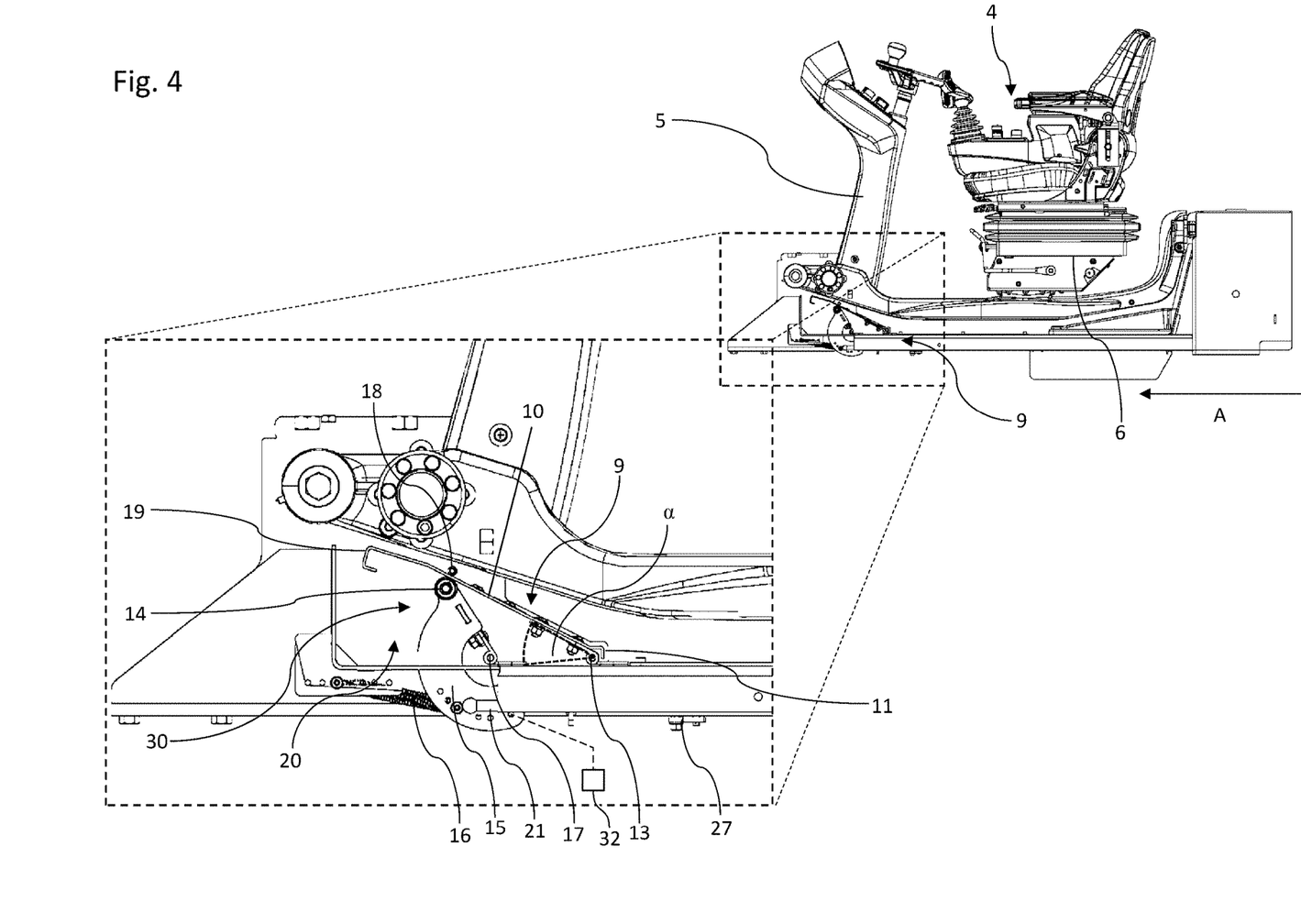
FIG. 4 shows a side view of the operator platform of a construction machine according to the present invention with non-actuated brake beam, the area of the brake beam and the actuator being particularly highlighted.

FIG. 4 shows the operator platform 4 in a side view. Here, in particular the region is emphasized in which the actuation device 9 with the brake beam 10 is arranged. In order to allow a better view of the mechanics of the actuation device 9, illustration of the side protection 12 has been omitted. The brake beam 10 is directly mounted on the platform base 8 via the hinge 13, and, together with the base, forms the rotation angle α. The hinge 13 is protected upwards and toward the operator seat 6 by means of protection strip 11. An edge 19 of the brake beam which is bent twice by 90 degrees is located at the side of the brake beam 10 facing away from the operator seat 19 such that the brake beam 10 has a U-shaped profile in this area. Just like the side protection 12, said edge serves for separating the hollow space 20 below the brake beam 10 and for protecting it against damage, for example, by dirt. At the same time, the double-bent edge 19 forms a support or stop surface for the brake beam 10 on the operator platform base 8.

The actuator 15, which can be seen in this view, is also arranged inside the hollow space 20 below the brake beam 10. The brake beam 10 rests with its own weight on a roller 14 which is part of the actuator 15. The degree of freedom of the actuator 15 is determined by another hinge 17. Actuator 15 is loaded by a return spring for returning the brake beam 10 to a rest position. By the tension of the spring 16, actuator 15 is pushed upwards, lifting the brake beam 10 in direction of its rest position as a result. Here, upwards movement of the brake beam 10 is limited by a stop trunnion 18 protruding beyond the brake beam 10. Therefore, in the rest position of brake beam 10 as shown in FIG. 4, the return spring 16 presses the brake beam 10 against the stop trunnion 18 via the actuator 15. In one embodiment as shown in FIG. 6, a spring break sensor 28 is arranged below the brake beam 10 for detecting a spring break of the return spring 16.

Figure 5:
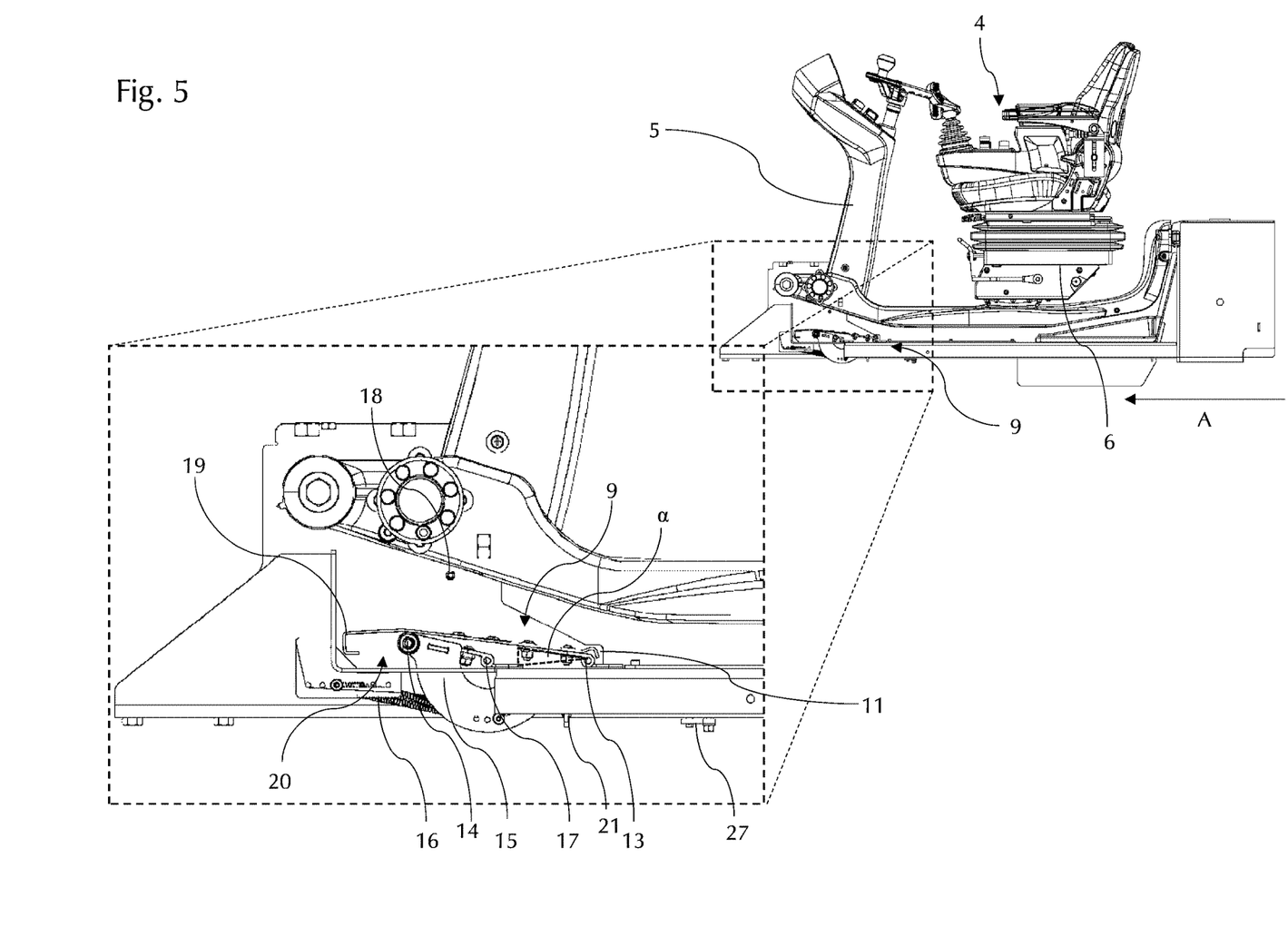
FIG. 5 shows a side view of the operator platform of a construction machine according to the present invention with the actuated brake beam, the area of the brake beam and the actuator being particularly highlighted.

FIG. 5 essentially illustrates the same regions as FIG. 4, with the difference that brake beam 10 is shown in a fully actuated position here, which may, for example, occur upon actuation by foot of the machine operator. If actuation surface 23 is pushed downwards by the foot of a machine operator, brake beam 10 pivots downwards via the hinge 13. As a result of the brake beam 10 being pushed downwards, actuator 15 is pushed downwards as well and folds down via the hinge 17. This additionally loads return spring 16 so that the effective spring force pushing the brake beam 10 upwards is increased. However, rotation angle α is limited, as in case of the machine operator acting with excessive force the brake beam 10 stops with its lower surface, in particular with the bent edge 19. This, when compared to the rest position of FIG. 4, maximally-hinged position of brake beam 10 is illustrated in FIG. 5. In one embodiment as shown in FIG. 4, a transmission mechanism 30 for the actuator 15 is arranged in the hollow space 20 so that it is entirely covered upward by the brake beam 10 and the platform base 8 in the region of the operator platform 4. The actuator 15 is preferably connected to an electric, hydraulic or pneumatic brake valve either in a mechanical or electrical manner as shown diagrammatically in FIG. 4 by reference numeral 32.

Figure 6:
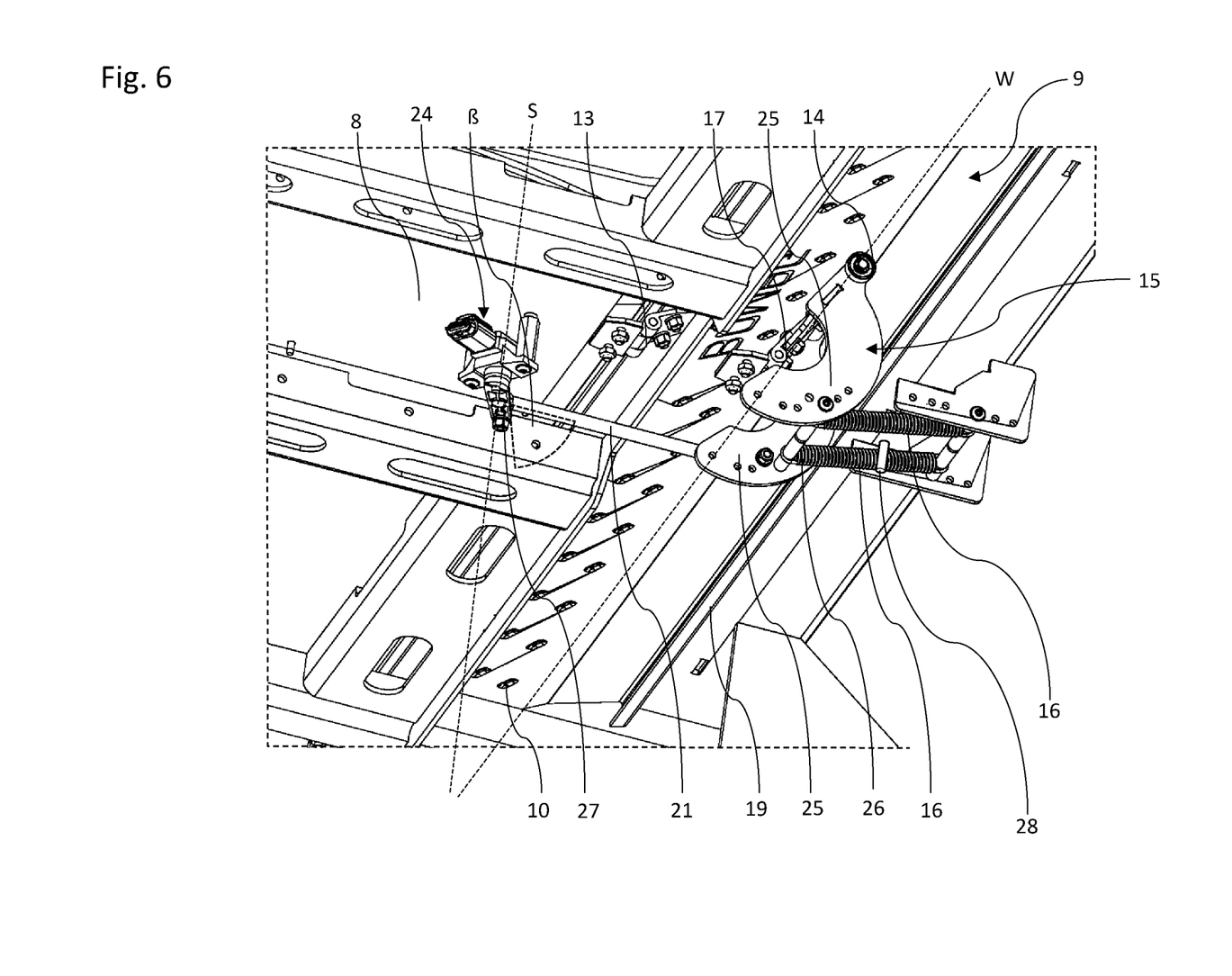
FIG. 6 shows a perspective view of the lower side of the actuation device of a construction machine according to the present invention, the area of the brake beam and the actuator being particularly highlighted.

FIG. 6 shows the actuation device 9 in a view from below, in particular representing the area of actuator 15. In order to better visualize the actuator 15 here, illustration of the operator platform base has been omitted. Actuator 15 comprises two curved discs 25 which are arranged in parallel and are connected to one another by an axle 26 and a hinge 17. Discs 25 are of semicircular geometry, with the circle center being located on the elongated pivot axis W of hinge 17. A roller 14 is in each case located on the upper end of discs 25, on which roller the brake beam rests. In relation to the semicircular geometry of discs 25, axle 26 is arranged essentially opposite the rollers 14. It is loaded by means of the return springs 16, which are fixed behind the rollers 14 relative to the platform base when viewed from axle 26. This way, the tension of the return springs 16 acting on the axle 26 is of an opposite effect to the load of rollers 14 by the weight of brake beam 10 and in particular by an actuation by foot of brake beam 10. Actuator 15 thus forms a brake pedal about the hinge 17 or the pivot axis W, with the force of the return springs 16 acting on the one side thereof and the weight force of brake beam 10 or weight force applied by the machine operator acting on the other side. The rotation axis of roller 14 and the pivot axis of brake beam 10 run parallel to one another. Upon actuation of brake beam 10, roller 14 thus rolls along the inner side of brake beam 10.

A lever 21 is arranged on one side of the parallel discs 25, said lever connecting the actuator 15 with a rotation angle sensor 24. Lever 21 is connected to disc 25 via a joint so that it is capable of rotating downwards and upwards, i.e., parallel to the extension of disc 25, as well as to the left and to the right, i.e., perpendicularly to the extension of disc 25. If brake beam 10 is folded down via hinge 13, actuator 15 rotates about hinge 17 and thus pushes lever 21 towards the rotation angle sensor 25. As the shank 27 of the rotation angle sensor 24, on which lever 21 is mounted on the opposite side, is mounted to be rotatable about an axis S running perpendicularly to the pivot axis W of actuator 15, clockwise rotation of actuator 15 results in the lever 21 rotating shank 27 about axis S in a direction away from actuator 15. Lever 21 folds to the outside on the joint, when viewed from disc 25. Said movement is effected by actuation of brake beam 10, for example. In turn, a counter-clockwise rotation of actuator 15 causes the lever 21 to fold inwards to the disc 25 and the shank 27 to be rotated about the axis S in a direction toward the actuator 15. This movement is effected by returning brake beam 10 by means of the return springs 16, for example. In both cases, rotation angle β of the shank 27 of the rotation angle sensor 24 changes at the same time. The rotation angle α of brake beam 10 is thus translated via actuator 15 and lever 21 into rotation angle β of the shank 27 of the rotation angle sensor 24, which angle is then measured by the rotation angle sensor 24 and then IT-processed in order to control the brake assembly.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

The invention claimed is:

1. A construction machine, comprising:
a brake assembly for braking the construction machine, and
an operator platform comprising a platform base and at least one operator seat that can be adjusted between a first operating position and a second operating position spaced laterally from the first position for a machine operator, and an actuation device for foot actuation of the brake assembly,
wherein the actuation device for the brake assembly comprises a brake beam which extends transversely to a working direction (A) of the construction machine on the operator platform and can be operated by foot from the first and second operating positions and an actuator for the brake beam which is arranged below the brake beam, and
wherein the at least one operator seat is adjustable horizontally and transversely to a working direction relative to the platform base of the operator platform and to the brake beam.

2. The construction machine according to claim 1, wherein the first and second operating positions are located on opposite sides of the operator platform.

3. The construction machine according to claim 1, wherein a surface of the brake beam facing the operator seat is configured as a continuous actuation surface.

4. The construction machine according to claim 3, wherein the actuation surface comprises an anti-slip coating.

5. The construction machine according to claim 1, wherein the brake beam is pivotally mounted on the platform base via a joint.

6. The construction machine according to claim 5, wherein the actuation device comprises a joint protection which is arranged above the joint.

7. The construction machine according to claim 5, wherein a transmission mechanism for the actuator is provided, said transmission mechanism being entirely covered upward by the brake beam and the platform base in the region of the operator platform.

8. The construction machine according to claim 5, wherein the actuation device comprises a rotation angle sensor which is arranged below the brake beam or below the platform base and which is configured to determine a rotation angle (α) of the brake beam.

9. The construction machine according to claim 5, wherein the joint is formed as at least one hinge.

10. The construction machine according to claim 1, wherein an edge of the brake beam facing away from the operator seat is bent downward.

11. The construction machine according to claim 1, wherein the actuation device comprises a return spring, and the actuator is loaded by the return spring in such a way that if the brake beam is not actuated, the brake beam is automatically returned to a rest position via the return spring.

12. The construction machine according to claim 11, wherein the actuation device comprises a spring break sensor which is configured to detect a spring break of the return spring of the brake beam, the spring break sensor being arranged below the brake beam.

13. The construction machine according to claim 1, wherein the actuator is centrally arranged with respect to an extension of the brake beam along a longitudinal central axis of the brake beam.

14. The construction machine according to claim 1, wherein the actuator comprises a roller via which the brake beam rests on the actuator such that the lower side of the brake beam forms a rolling surface for the roller.

15. The construction machine according to claim 1, wherein the actuator of the brake beam is configured as a brake pedal, the brake pedal being arranged such that it is pivotable about an axis (W) between a maximally actuated position and a non-actuated position.

16. The construction machine according to claim 1, wherein the actuator of the brake beam is mechanically connected to an electric, hydraulic or pneumatic brake valve.

17. The construction machine according to claim 1, wherein the actuation device comprises a side protection which is arranged on a side of the brake beam facing away from the operator seat and is configured to seal a hollow space below the brake beam toward said side.

18. The construction machine according to claim 1, wherein the brake assembly is part of a brake system of the construction machine and is configured as an operating brake.

19. The construction machine according to claim 1, wherein the operator seat comprises at least one of the following features:
the operator seat is configured as a rotatable operator seat,
the operator seat is configured as a laterally displaceable operator seat,
the operator seat is arranged on a laterally displaceable seat support, or
the operator seat is arranged relative to the brake beam in such a way that the brake beam is located within a comfort region of the seated machine operator, said region defined by the DIN EN ISO 6682:2009-06 standard for foot-actuatable controls in earth moving machines.

20. The construction machine according to claim 1, wherein the construction machine is configured as a road finisher, a soil compactor or a rubber-tired roller.

* * * * *